(12) United States Patent
Akahane et al.

(10) Patent No.: US 8,043,649 B2
(45) Date of Patent: Oct. 25, 2011

(54) EDIBLE FAT AND OIL, PROCESS OF PRODUCING THE SAME, AND CHOCOLATE CONTAINING FAT AND OIL COMPOSITION

(75) Inventors: Akira Akahane, Kanagawa (JP); Yoshiyuki Hatano, Kanagawa (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 444 days.

(21) Appl. No.: 12/310,662

(22) PCT Filed: Aug. 24, 2007

(86) PCT No.: PCT/JP2007/066453
§ 371 (c)(1),
(2), (4) Date: Mar. 3, 2009

(87) PCT Pub. No.: WO2008/029642
PCT Pub. Date: Mar. 13, 2008

(65) Prior Publication Data
US 2010/0112161 A1    May 6, 2010

(30) Foreign Application Priority Data
Sep. 5, 2006   (JP) .................. 2006-240702

(51) Int. Cl.
  *A23D 9/00* (2006.01)
(52) U.S. Cl. ............... 426/607; 426/631; 554/30
(58) Field of Classification Search ............... 426/607, 426/631; 554/30
See application file for complete search history.

(56) References Cited

U.S. PATENT DOCUMENTS

| | | | |
|---|---|---|---|
| 3,949,105 A * | 4/1976 | Wieske et al. | 426/607 |
| 3,956,522 A * | 5/1976 | Kattenberg et al. | 426/603 |
| 4,410,557 A * | 10/1983 | Miller | 426/607 |
| 4,562,079 A * | 12/1985 | Herzing | 426/94 |
| 4,567,056 A * | 1/1986 | Schmidt | 426/607 |
| 4,726,959 A | 2/1988 | Momura et al. | |
| 4,902,527 A * | 2/1990 | Galenkamp et al. | 426/607 |
| 5,061,506 A * | 10/1991 | Leach | 426/602 |
| 5,324,533 A | 6/1994 | Cain et al. | |
| 5,424,090 A | 6/1995 | Okawauchi et al. | |
| 6,048,564 A * | 4/2000 | Young et al. | 426/573 |
| 7,700,146 B2 * | 4/2010 | Cleenewerck | 426/607 |
| 2005/0142275 A1 | 6/2005 | Bach et al. | |

FOREIGN PATENT DOCUMENTS

| | | |
|---|---|---|
| EP | 0 530 864 A1 | 3/1993 |
| JP | 63-014675 | 1/1988 |

OTHER PUBLICATIONS

Swern, D. 1979. Bailey's Industrial Oil and Fat Products, vol. 1, 4th edition. John Wiley & Sons. New York. p. 318-319.*
Extended European Search Report dated Oct. 5, 2010 in a counterpart application EP 07806039.9.
Smith, K.W. et al, "Nature and composition of fat bloom from palm kernel stearin and hydrogenated palm kernel stearin compound chocolates", Journal of Agriicultural and Food Chemistry, American Chemical Society, US, Jan. 1, 2004, pp. 5539-5544, vol. 52.
Torbica , Aleksandra et al, "The advantages of solid fat content determination in cocoa butter and cocoa butter equivalents by the Karlshamns method", European Food Research and Technology; Zeitschrift Fur Lebensmitteluntersuchung Und -Forschung A, Springer, Berlin, Feb. 1, 2006, pp. 385-391, vol. 222, No. 3-4.
English language International Preliminary Report on Patentability in international application PCT/JP2007/066453 (5 pages) issued Mar. 17, 2009.

* cited by examiner

*Primary Examiner* — Carolyn Paden
(74) *Attorney, Agent, or Firm* — Holtz, Holtz, Goodman & Chick, PC

(57) ABSTRACT

[Purpose] To provide edible fat and oil that can further improve blooming resistance, and chocolate having further improved blooming resistance than that of conventional chocolate. [Constitution] Edible fat and oil obtained by transesterification reaction or esterification reaction and satisfying the following requirements (A) to (D): (A) iodine value: 15 to 29; B) amount of trans fatty acids in the constituent fatty acids: 16 to 29% by mass; (C) amount of lauric acid in the constituent fatty acids: 13 to 28% by mass; and (D) total amount of oleic acid, linoleic acid, and linolenic acid in the constituent fatty acids: less than 10% by mass.

21 Claims, No Drawings

EDIBLE FAT AND OIL, PROCESS OF PRODUCING THE SAME, AND CHOCOLATE CONTAINING FAT AND OIL COMPOSITION

This application is the United States national phase application of International Application PCT/JP2007/066453 filed Aug. 24, 2007.

TECHNICAL FIELD

The present invention relates to edible fat and oil having blooming resistance, a process of producing the same, and chocolate containing the edible fat and oil.

BACKGROUND ART

Background of the Invention

Chocolate is a fatty confectionery that is produced by mixing cacao mass, cocoa, cacao butter, powdered milk, a sweetening agent, and other ingredients and subjecting the mixture to grinding, kneading, and tempering treatment. Chocolate has a phenomenon in which white powder-like substance appears on the surface of the chocolate depending on storage conditions. This phenomenon is called blooming and is roughly classified into sugar blooming due to sugar contained in the chocolate and fat blooming due to fat and oil contained in the chocolate. Such occurrence of the blooming significantly decreases commercial values of chocolate products.

Accordingly, in order to prevent such fat blooming, blooming-preventing agents have been previously developed.

For example, Patent Document 1 discloses a method of preventing blooming of chocolate by blending 0.5% by mass or more of fat and oil (H2M+HM2 fat) of which main ingredient is triacylglycerol containing at least a C12-14 saturated fatty acid and a C16-18 saturated fatty acid, so that the chocolate has a specific chocolate composition.

Test fats and oils 2 to 4 described below are equivalent to the fat and oil disclosed in Patent Document 1.

In addition, Patent Document 2 discloses a method of preventing blooming of chocolate by blending a fat blooming-preventing agent composed of a fat and oil composition containing certain amounts of a C20-24 saturated fatty acid and a C16-22 unsaturated fatty acid as constituent fatty acids and containing a certain amount of mixed acid group triacylglycerol including at least a C20-24 saturated fatty acid and a C16-22 unsaturated fatty acid in one molecule.

Test fat and oil 5 described below is equivalent to the fat and oil disclosed in Patent Document 2.

Furthermore, Patent Document 3 discloses a method of preventing blooming of chocolate by blending an anti-blooming agent containing at least a certain amount of mono-U-di-S triacylglycerol (SSU) in which a residue (U) of fatty acid having a melting point lower than 40° C. is bound at the 1-position or 3-position and a residue (S) of saturated fatty acid having a melting point higher than 45° C. is bound at the remaining positions, wherein the melting points are those of the respective free fatty acids, and the number of the stearic acid residue or the palmitic acid residue in the entire S is larger than a certain amount.

Test fat and oil 6 described below is equivalent to the fat and oil disclosed in Patent Document 3.

[Patent Document 1] Japanese Unexamined Patent Application Publication No. 6-292510
[Patent Document 2] Japanese Unexamined Patent Application Publication No. 62-6635
[Patent Document 3] Japanese Unexamined Patent Application Publication No. 2-138937

DISCLOSURE OF INVENTION

Problems to be Solved by the Invention

By using the blooming-preventing agents disclosed in Patent Documents 1 to 3, blooming of chocolate can be prevented to some extent. However, any of the blooming-preventing agents is still insufficient in its effect.

In view of the above-mentioned problems, it is an object of the present invention to provide edible fat and oil that can further increase blooming resistance, a process of producing the same, and chocolate having further increased blooming resistance than that of conventional chocolate.

SUMMARY OF THE INVENTION

Means for Solving the Problems

The present inventors have conducted intensive studies to solve the above-mentioned problems and, as a result, have found that a fat and oil composition obtained by transesterification reaction or esterification reaction can achieve the above-mentioned object when it has a iodine value in a certain range and includes constituent fatty acids having the amounts of trans fatty acids, lauric acid, and the total of oleic acid, linoleic acid, and linolenic acid in certain ranges. Thus, the present invention has been completed.

That is, the present invention provides edible fat and oil that can be obtained by transesterification reaction or esterification reaction and satisfy the following requirements (A) to (D):
(A) iodine value: 15 to 29;
(B) amount of trans fatty acids in the constituent fatty acids: 16 to 29% by mass;
(C) amount of lauric acid in the constituent fatty acids: 13 to 28% by mass; and
(D) total amount of oleic acid, linoleic acid, and linolenic acid in the constituent fatty acids: less than 10% by mass.

Edible fat and oil satisfying the above requirements can exhibit the above-mentioned effect.

Furthermore, the present invention provides the edible fat and oil that is obtained by transesterifying mixed oil containing hydrogenated oil whose iodine value is 45 or less and the amount of trans fatty acids in the constituent fatty acids is 30% by mass or more and fat and oil whose iodine value is 10 or less and the amount of lauric acid in the constituent fatty acids is 40% by mass or more.

Examples of the hydrogenated oil include hydrogenated soybean oil, and examples of the fat and oil include fully hydrogenated palm kernel oil.

The mixing ratio of the hydrogenated oil and the fat and oil in the mixed oil is preferably 4:6 to 7:3.

Fat and oil prepared at such a specific mixing ratio is easy to use in view of hardness and melting texture of chocolate containing the fat and oil.

The edible fat and oil can be used for chocolate.

That is, the present invention provides chocolate containing the edible fat and oil of the present invention. The edible fat and oil of the present invention can exhibit blooming-preventing effect when it is contained in chocolate. Accordingly, the application to chocolate is one of the applications of the edible fat and oil according to the present invention.

Furthermore, the present invention provides chocolate containing the edible fat and oil in an amount of 0.5 to 10% by mass based on the total amount of fat and oil in the chocolate.

Furthermore, the present invention provides a process of producing the edible fat and oil. The process includes the step of transesterifying mixed oil containing hydrogenated oil whose iodine value is 45 or less and the amount of trans fatty acids in the constituent fatty acids is 30% by mass or more and fat and oil whose iodine value is 10 or less and the amount of lauric acid in the constituent fatty acids is 40% by mass or more. In the process, the mixing ratio of the hydrogenated oil and the fat and oil in the mixed oil is adjusted such that the resulting edible fat and oil satisfies the following requirements (A) to (D):
(A) iodine value: 15 to 29;
(B) amount of trans fatty acids in the constituent fatty acids: 16 to 29% by mass;
(C) amount of lauric acid in the constituent fatty acids: 13 to 28% by mass; and
(D) total amount of oleic acid, linoleic acid, and linolenic acid in the constituent fatty acids: less than 10% by mass.

According to this specific process of producing edible fat and oil, edible fat and oil that can exhibit the above-mentioned effect can be obtained.

Advantages

According to the present invention, edible fat and oil that can significantly improve blooming resistance of chocolate containing the edible fat and oil compared to that of conventional chocolate is provided.

DETAILED DESCRIPTION OF THE INVENTION

Best Modes for Carrying Out the Invention

First, the edible fat and oil of the present invention will be described below.

That is, the edible fat and oil of the present invention is obtained by transesterification reaction or esterification reaction and satisfy the following requirements (A) to (D):
(A) iodine value: 15 to 29;
(B) amount of trans fatty acids in the constituent fatty acids: 16 to 29% by mass;
(C) amount of lauric acid in the constituent fatty acids: 13 to 28% by mass; and
(D) total amount of oleic acid, linoleic acid, and linolenic acid in the constituent fatty acids: less than 10% by mass.

Transesterification Reaction or Esterification Reaction

The term "transesterification reaction or esterification reaction" used in this invention means, for example, a reaction of esterifying a hydroxyl group in glycerin and carboxylic acid in fatty acid. Examples of the transesterification reaction or esterification reaction include enzymatic or chemical transesterification or esterification reaction. Examples of the enzymatic transesterification include processes using lipase derived from *Candida* sp. yeast or lipase derived from *Alcaligenes* sp. Examples of the chemical transesterification include processes using sodium methylate as a catalyst. The process of transesterification reaction or esterification reaction will be described below.

In the present invention, it is intended that examples of the "edible fat and oil obtained by transesterification reaction or esterification reaction" do not include mixed oil of two or more types of fat and oil that are merely mixed. This is because that mixed oil does not completely melt at a temperature of 35° C. or higher and is therefore unfit for application to chocolate. Furthermore, in general, mixed oil unevenly includes fat and oil containing a large amount of lauric acid in the molecule or fat and oil containing a large amount of trans fatty acids in the molecule and, therefore, can hardly or cannot achieve the effect, i.e., the purpose of the present invention. That is, the effect of the present invention is achieved by using edible fat and oil obtained by transesterification reaction or esterification reaction.

The edible fat and oil of the present invention satisfies the following (A) to (D):
(A) iodine value: 15 to 29;
(B) amount of trans fatty acids in the constituent fatty acids: 16 to 29% by mass;
(C) amount of lauric acid in the constituent fatty acids: 13 to 28% by mass; and
(D) total amount of oleic acid, linoleic acid, and linolenic acid in the constituent fatty acids: less than 10% by mass.

The requirements (A) to (D) will be sequentially described below.

Iodine Value

The requirement (A) will be described.

The term "iodine value" used in this invention means the mass of iodine in grams that is consumed by 100 g of fat and oil. A larger iodine value means a larger number of unsaturated bonds in the constituent fatty acids. The iodine value of the edible fat and oil of the present invention is 15 to 29, preferably 15 to 27, more preferably 16 to 26, more preferably 18 to 26, more preferably 19 to 26, and most preferably 20 to 22. An iodine value within the above-mentioned range can exhibit the effect of the present invention and is therefore preferred.

Amount of Trans Fatty Acids

Next, the requirement (B) will be described.

The term "trans fatty acids" used in this invention means trans geometric isomers of fatty acids. It is known that such trans fatty acids are generated, for example, when fat and oil including unsaturated fatty acids is hydrogenated. The ratio of the generation depends on conditions for the hydrogenation. The conditions for the hydrogenation are influenced by various factors such as the size of autoclave, hydrogen pressure, reaction temperature, the type of catalyst, and the amount of catalyst and, therefore, are not categorically determined. These factors can be properly adjusted by those skilled in the art.

In this invention, the "amount of trans fatty acids in the constituent fatty acids" of the edible fat and oil is expressed as "% by mass" (hereinafter, it is abbreviated to "%", and "%" means "% by mass", unless otherwise specified, in this invention) of trans fatty acids based on the total amount of fatty acids constituting the edible fat and oil. The amount of trans fatty acids in the constituent fatty acids can be determined by, for example, methylesterifying the fatty acids in fat-and-oil molecules and measuring the resulting fatty acid methyl esters by gas chromatography. The "amount of trans fatty acids in the constituent fatty acids" of the edible fat and oil of the present invention is 16 to 29%, preferably 16 to 27%, more preferably 16 to 25%, more preferably 18 to 25%, more preferably 19 to 25%, and most preferably 19 to 22%. An amount of trans fatty acids in the constituent fatty acids within the above-mentioned range can exhibit the effect of the present invention and is therefore preferred.

Amount of Lauric Acid

Next, the requirement (C) will be described.

Lauric acid is a saturated fatty acid with 12 carbon atoms (C12:0) and is also called dodecanoic acid.

In this invention, the "amount of lauric acid in the constituent fatty acids" of the edible fat and oil is a ratio (% by mass) of lauric acid to the total amount of fatty acids constituting the edible fat and oil. The amount can be determined by, for example, methylesterifying the fatty acids in fat-and-oil molecules and measuring the resulting fatty acid methyl esters by gas chromatography. The "amount of lauric acid in the constituent fatty acids" of the edible fat and oil of the present invention is 13 to 28%, preferably 16 to 28%, more preferably 18 to 28%, more preferably 18 to 26%, more preferably 18 to 24%, and most preferably 22 to 24%. An amount of lauric acid in the constituent fatty acids within the above-mentioned range can exhibit the effect of the present invention and is therefore preferred.

Total Amount of Oleic Acid, Linoleic Acid, and Linolenic Acid

Next, the requirement (D) will be described.

Oleic acid is a cis unsaturated fatty acid having 18 carbon atoms and one double bond (C18:1). Linoleic acid is a cis unsaturated fatty acid having 18 carbon atoms and two double bonds (C18:2). Linolenic acid is a cis unsaturated fatty acid having 18 carbon atoms and three double bonds (C18:3).

In this invention, the "total amount of oleic acid, linoleic acid, and linolenic acid in the constituent fatty acids" of the edible fat and oil is a ratio (% by mass) of the sum of the amounts of oleic acid, linoleic acid, and linolenic acid to the total amount of fatty acids constituting the edible fat and oil. The amount can be determined by, for example, methylesterifying the fatty acids in fat-and-oil molecules and measuring the resulting fatty acid methyl esters by gas chromatography. The "total amount of oleic acid, linoleic acid, and linolenic acid in the constituent fatty acids" of the edible fat and oil of the present invention is less than 10%, preferably less than 7%, more preferably less than 6%, more preferably 3 to 6%, more preferably 3 to 4.5%, and most preferably 3.9 to 4.2%. A total amount of oleic acid, linoleic acid, and linolenic acid in the constituent fatty acids within the above-mentioned range can exhibit the effect of the present invention and is therefore preferred.

When the unsaturated fatty acids in the constituent fatty acids of fat and oil are mainly C18:1, C18:2, or C18:3, the "total amount of oleic acid, linoleic acid, and linolenic acid in the constituent fatty acids" can be calculated by subtracting the amount of trans fatty acids from the sum of the amounts of C18:1, C18:2, and C18:3.

The edible fat and oil of the present invention can be produced by, for example, enzymatically or chemically transesterifying mixed oil containing hydrogenated oil having an iodine value of 45 or less and containing 30% by mass or more of trans fatty acids in the constituent fatty acids and fat and oil having an iodine value of 10 or less and containing 40% by mass or more of lauric acid in the constituent fatty acids at a predetermined ratio described below in the presence of an enzymatic or chemical catalyst (such as sodium methylate).

Hydrogenated Oil Having an Iodine Value of 45 or Less and Containing 30% by Mass or More of Trans Fatty Acids in the Constituent Fatty Acids The hydrogenated oil having an iodine value of 45 or less and containing 30% by mass or more of trans fatty acids in the constituent fatty acids will be described. The hydrogenated oil (fat-and-oil raw material) having an iodine value of 45 or less and containing 30% by mass or more of trans fatty acids in the constituent fatty acids is not particularly limited, and examples thereof include hydrogenated oil produced by hydrogenating fat and oil selected from soybean oil, rapeseed oil, palm oil, cottonseed oil, corn oil, safflower oil, sunflower oil, and fractionated and/or transesterified oil thereof. In addition, fat and oil prepared by further fractionating the above-mentioned hydrogenated oil can be used.

The hydrogenated oil having an iodine value of 45 or less and containing 30% by mass or more of trans fatty acids in the constituent fatty acids can be produced by properly hydrogenating the above-mentioned fat and oil as described above. The conditions for the hydrogenation can be suitably determined and adjusted by those skilled in the art.

The iodine value of the hydrogenated oil is 45 or less and is preferably 25 to 45, more preferably 35 to 44, and most preferably 40 to 43, in the view that the hydrogenated oil is mixed with fat and oil containing lauric acid.

The amount of the trans fatty acids in the constituent fatty acids of this hydrogenated oil is 30% by mass or more and is preferably 30 to 60% by mass, more preferably 35 to 50% by mass, in the view that the hydrogenated oil is mixed with fat and oil containing lauric acid.

The total amount of oleic acid, linoleic acid, and linolenic acid in the constituent fatty acids of this hydrogenated oil is not particularly limited within the ranges that satisfy the above-mentioned amount of the trans fatty acids and the iodine value, and is preferably 20% by mass or less, more preferably 5 to 20% by mass, and most preferably 5 to 10% by mass, in the view that the hydrogenated oil is mixed with fat and oil containing lauric acid.

The hydrogenated oil can be, for example, hydrogenated soybean oil produced by hydrogenating soybean oil. When hydrogenated soybean oil is used, the hydrogenated soybean oil that can be used has an iodine value of 25 to 45 and contains 30 to 60% by mass of trans fatty acids in the constituent fatty acids and, preferably, has an iodine value of 35 to 44 and contains 35 to 50% by mass of trans fatty acids in the constituent fatty acids.

Specifically, the hydrogenated oil used in this invention is, for example, hydrogenated soybean oil (melting point: 55° C.) (amount of trans fatty acids in the constituent fatty acids: 40.5%, iodine value: 42.2) produced by hydrogenating soybean oil. In this case, since the amount of C18:1 is higher than those of C18:2 and C18:3, the main ingredient of this trans fatty acids is a trans fatty acid of C18:1 (elaidic acid).

Fat and Oil Having an Iodine Value of 10 or Less and Containing 40% by Mass or More of Lauric Acid in the Constituent Fatty Acids Next, the fat and oil having an iodine value of 10 or less and containing 40% by mass or more of lauric acid in the constituent fatty acids will be described. The fat and oil having an iodine value of 10 or less and containing 40% by mass or more of lauric acid in the constituent fatty acids (hereinafter, occasionally, referred to as fat-and-oil raw material) is not particularly limited, and examples thereof include oil prepared by hydrogenating and/or fractionating fat and oil such as palm kernel oil or palm oil.

The fat and oil having an iodine value of 10 or less and containing 40% by mass or more of lauric acid can be produced by properly hydrogenating and/or fractionating fat and oil such as palm kernel oil or palm oil, as described above. The conditions for the hydrogenation and fractionation can be suitably determined and adjusted by those skilled in the art.

The iodine value of the fat-and-oil raw material is 10 or less, and those having an iodine value of 8 or less, 5 or less, or 3 or less can be preferably used, in the view that the fat-and-oil raw material is mixed with fat and oil containing trans fatty acids. Furthermore, when fully hydrogenated oil is used, for example, those having an iodine value of 2 or less can be used.

The amount of lauric acid contained in the constituent fatty acids of the fat-and-oil raw material is 40% by mass or more and is preferably 40 to 60% by mass and more preferably 40 to 50% by mass, in the view that the fat-and-oil raw material is mixed with fat and oil containing trans fatty acids.

The total amount of oleic acid, linoleic acid, and linolenic acid in the constituent fatty acids of the fat-and-oil material is not particularly limited within the range that satisfies the above-mentioned iodine value. The total amount is preferably 10% by mass or less, more preferably 7% by mass or less, more preferably 5% by mass or less, and most preferably 3% by mass or less, in the view that the fat-and-oil raw material is mixed with fat and oil containing trans fatty acids. Furthermore, when fully hydrogenated oil is used, for example, the total amount can be less than 1% by mass or can be less than 0.5% by mass.

The fat-and-oil raw material that can be used is, for example, fully hydrogenated palm kernel oil produced by hydrogenating palm kernel oil. When the fully hydrogenated palm kernel oil is used, the lauric acid content thereof in the constituent fatty acids is 40 to 60% by mass and preferably 40 to 50% by mass. Furthermore, the fully hydrogenated palm kernel oil can be used has a iodine value of 2 or less and preferably 1 or less.

Examples of the fat-and-oil raw material include fully hydrogenated palm kernel oil (amount of lauric acid: 46.3%, iodine value: 0.4) produced by hydrogenating palm kernel oil.

Adjustment of Mixing Ratio in Mixed Oil

The edible fat and oil of the present invention can be obtained, for example, by transesterifying mixed oil containing at least one of the above-mentioned hydrogenated oils and at least one of the above-mentioned fat-and-oil raw materials.

The fat and oil (hydrogenated oil) containing trans fatty acids and the fat and oil (fat-and-oil raw material) containing lauric acid in the mixed oil can be mixed at a desired ratio such that the fat and oil obtained by transesterifying the mixed oil satisfies the above-mentioned requirements (A) to (D). Therefore, the mixing ratio in the mixed oil can be properly adjusted as long as the fat and oil obtained by transesterification of the mixed oil satisfies the requirements (A) to (D).

For example, mixed oil containing the hydrogenated soybean oil having the above-mentioned melting point and the fully hydrogenated palm kernel oil at a mixing ratio of 4:6 to 7:3, preferably 4:6 to 6:4, and more preferably 5:5 to 6:4 is transesterified to give edible fat and oil. By doing so, the resulting edible fat and oil satisfies the requirements (A) to (D).

Therefore, for example, as shown in Tables 10 and 11 regarding Examples and their explanation described below, if the iodine value of the fat-and-oil raw material and the amounts of trans fatty acids and lauric acid in the constituent fatty acids in the mixed oil can be determined, it is possible to those skilled in the art to prepare the edible fat and oil that satisfies the requirements (A) to (D) by properly adjusting the mixing ratio of mixed oil.

Basically, the edible fat and oil of the present invention can be produced using mixed oil containing at least one of the above-mentioned hydrogenated oils and at least one of the above-mentioned fats and oils, but other fat and oil may be added to the mixed oil, according to need.

The edible fat and oil of the present invention may be added to any food without particular limitation. For example, the edible fat and oil can be used as a fat-and-oil raw material for margarine or shortening and also can be used as an additive for chocolate.

The present invention provides chocolate containing the edible fat and oil of the present invention.

The term "chocolate" used in this invention is not limited to those prescribed in regulation (fair competition rules concerning labeling in chocolate industry) or in provision of law, but means chocolates and oiled food containing cacao butter or cacao butter equivalent. These chocolates and oiled food include chocolate and quasi-chocolate prescribed in fair competition rules concerning labeling in chocolate industry (Chocolate Industry Fair Trade Council).

The edible fat and oil of the present invention can be used for both tempered chocolate and non-tempered chocolate. The tempered chocolate is produced by a process including a step for modifying the crystals of fat and oil to a stable form. The step is generally carried out by tempering. On the other hand, the non-tempered chocolate is produced by a process not including such a step.

In both the tempered and non-tempered chocolates, blooming is not a small problem. Since the edible fat and oil of the present invention has blooming resistance described below, the application thereof to chocolate as an additive is one of effective applications.

The amount of the edible fat and oil of the present invention contained in the chocolate of the present invention is not particularly limited, but is usually 0.5 to 10% by mass and preferably 0.5 to 5% by mass of the total amount of fat and oil in the chocolate. When the amount of the edible fat and oil of the present invention is less than 0.5% by mass of the total amount of fat and oil in chocolate, the blooming resistance may be insufficient. On the other hand, when the amount is larger than 10% by mass, the produced chocolate is too softened at around 20° C. and the amount of chocolate unmelted at around 35° C. is increased, due to the physical properties of the edible fat and oil. Thus, physical properties suitable for chocolate may not be maintained.

In general, commercially available chocolate contains 30 to 50% of oil. In such a case, for example, the amount of the edible fat and oil of the present invention is preferably 0.15 to 5% by mass of the total mass of chocolate.

The edible fat and oil of the present invention can be used for chocolate, as described above. As afore-described, chocolate may have a phenomenon in which white powder-like substance appears on the surface of the chocolate depending on storage conditions, resulting in a decrease in quality. This phenomenon is called blooming. The edible fat and oil of the present invention exhibits effect of suppressing occurrence of this blooming (blooming resistance) by being added to chocolate.

Therefore, the edible fat and oil of the present invention is suitably used for chocolate (application to chocolate). In such a case, the edible fat and oil of the present invention functions as an anti-blooming agent.

The present invention provides chocolate containing the edible fat and oil of the present invention.

The edible fat and oil (anti-blooming agent) of the present invention can be added to both tempered chocolate and non-tempered chocolate.

In addition, the present invention provides fat-and-oil raw material for chocolate containing the edible fat and oil of the present invention and cacao butter and/or cacao butter equivalent. Here, the cacao butter and cacao butter equivalent are fats and oils whose main ingredient is 2-unsaturated-1,3-disaturated triacylglycerol and are mainly used as raw materials for chocolate.

The fat and oil is used as raw material for chocolate, and the concentration of the edible fat and oil of the present invention in the fat-and-oil raw material for chocolate is not particularly limited and is, for example, 0.5 to 10% by mass, preferably 0.5 to 5% by mass, of the total amount of the fat and oil. As long as the amount of the edible fat and oil of the present invention is within this range, other fat and oil may be contained.

The edible fat and oil of the present invention has blooming resistance, as described above. The method for evaluating blooming resistance will be described below.

Blooming resistance can be evaluated by a blooming test where periodic change in temperature, generally, a process of placing chocolate at about 20° C. for a predetermined period of time and then at about 30° C. for a predetermined period of time as one cycle, is repeated and then visually inspecting occurrence of blooming. A larger number of cycles are repeated until the occurrence of blooming means higher blooming resistance. Though the method of blooming test is not limited to the following process, the method of blooming test in Example described below, i.e., one cycle of at 20° C. for 12 hours and then at 32° C. for 12 hours, can be exemplified.

The edible fat and oil of the present invention exhibits blooming resistance effect when it is added to chocolate. It is preferred that chocolate exhibit various effects and, at the same time, have hardness and melting texture properties suitable as chocolate. Accordingly, it is further preferred that the edible fat and oil of the present invention exhibit a certain SFC (solid fat content), from the viewpoints of hardness and melting texture properties suitable as chocolate. The SFC can be determined by Standards Methods for the Analysis of Fat and oil (provisional method) with a pulse NMR solid fat content analyzer.

For example, the SFC of the edible fat and oil of the present invention is preferably slightly higher than that of cacao butter, which is contained in chocolate.

Though the cacao butter contained in chocolate is fat and oil whose main ingredient is 2-unsaturated-1,3-disaturated triacylglycerol, the main ingredient of the edible fat and oil of the present invention is triacylglycerol that is absolutely different from that of the cacao butter. In general, a mixture of such different types of triacylglycerol forms eutectic crystals with a tendency to have a melting point lower than those of the individual triacylglycerols. Therefore, chocolate can have suitable hardness by using edible fat and oil of the present invention having an SFC slightly higher than that of cacao butter.

For example, when the edible fat and oil of the present invention is used in chocolate, it is preferable that the edible fat and oil have an SFC at 25° C. higher than that of cacao butter by 5% or more (that is, the SFC is at least 105% of the SFC of cacao butter). Specifically, for example, when the SFC of cacao butter at 25° C. is 62.4, the SFC of the edible fat and oil is preferably 65.5 or more. An SFC at 25° C. within this range is preferred in view of hardness suitable for chocolate.

In addition to the above, the SFC at 35° C. is preferably 38 or less, more preferably 35 or less, more preferably 33 or less, and most preferably 31 or less. An SFC at 35° C. within this range is preferred in view of suitable melting texture.

The edible fat and oil having an SFC within the above-mentioned range exhibits hardness and melting texture suitable for chocolate as described above and is therefore easy-to-use and preferred. However, in some cases, even if edible fat and oil used has an SFC out of the above-mentioned range, the hardness and melting texture suitable for chocolate may be obtained by additionally using other additives and fat and oil.

Next, transesterification reaction used in the process of producing the edible fat and oil of the present invention will be described. The method of the transesterification reaction is not particularly limited and can be carried out by a known method.

Process of Producing Edible Fat and Oil

The transesterification reaction used in the process of producing the edible fat and oil of the present invention can be carried out by a known method. The transesterification reaction can be carried out enzymatically or chemically. Here, a process of producing fat and oil by transesterification reaction using a common enzyme will be described.

First, a plurality of fat-and-oil raw materials at a desired ratio is mixed and stirred while heating as necessary to give uniform mixed oil. An enzyme preparation (for example, lipase) is added to this mixed oil while uniformly stirring and heating as necessary. The transesterification reaction progresses by further stirring at a certain temperature for a certain period of time. After the completion of the reaction, the enzyme preparation is removed by filtration. The filtrate, i.e., fat and oil, is subjected to purification treatment for decolorization and deodorization according to a common procedure to give the edible fat and oil of the present invention.

The "mixing fat-and-oil raw materials at a desired ratio" is the same as described above. The transesterification reaction can be carried out with, for example, a batch container having an agitator. The amount of the enzyme preparation used is, for example, 0.005 to 10% by mass based on the amount of the fat and oil (mixed oil) used in the reaction. The transesterification reaction can be carried out under conditions, for example, at 30 to 130° C. for 1 to 72 hours. The amount of water in the fat and oil (mixed oil) used in the reaction can be, for example, 5 to 1500 (or 5 to 500) ppm. The completion of the transesterification reaction can be confirmed by measuring the reaction product, triacylglycerol composition, by gas chromatography. The reaction is terminated by removing the enzyme by filtration. The fat and oil as the reaction product is subjected to purification treatment for decolorization and deodorization according to a common procedure. If necessary, washing with water and drying treatment may be performed before the purification treatment.

Next, a process of producing chocolate containing the edible fat and oil of the present invention will be described.

The chocolate can be produced from chocolate material by using cacao mass, sugar, cacao butter, and other ingredients as in a usual chocolate-producing process. Alternatively, the chocolate may be produced by adding the edible fat and oil of the present invention to commercially available chocolate material.

The case of using commercially available chocolate material will be described.

Commercially available chocolate material is put in a certain container (such as bowl or pan) and is melted by being heated. The edible fat and oil of the present invention is added to the melted chocolate while uniformly stirring. Moreover, the resulting mixture is sufficiently stirred while heating. Then, after tempering treatment, the chocolate is poured into a mold and cooled in a refrigerator for hardening. After the hardening, the chocolate is taken out from the refrigerator and then removed from the mold. The chocolate is mellowed to produce chocolate containing the edible fat and oil of the present invention.

The chocolate material can be melted by, for example, putting the container in hot water of 60° C. Tempering can be carried out by, for example, cooling chocolate to 26° C. while stirring and then heating it again to 30° C. while stirring. The hardening in a refrigerator can be carried out by, for example, cooling the chocolate at 8° C. for 20 minutes. The mellowing can be carried out by, for example, putting chocolate at 20° C. for one week.

Effect of the edible fat and oil of the present invention on chocolate containing cocoa butter only and on chocolate containing cocoa butter equivalent that includes a large amount of symmetric triacylglycerol will be described below.

First, abbreviates used below will be described. S means a long-chain saturated fatty acid having 16 or more carbon atoms, and U means a long-chain unsaturated fatty acid having 16 or more carbon atoms. S2U means triacylglycerol having two S's and one U that are bonded to the glycerin moiety, and, among them, symmetric triacylglycerol is denoted by SUS, and asymmetric triacylglycerol is denoted by SSU. In addition, POP means triacylglycerol having palmitic acid bonded to the 1,3-positions of the glycerin moiety and oleic acid bonded to the 2-position of the glycerin moiety.

It is generally known that occurrence of blooming is suppressed by increasing the ratio of SSU in S2U contained in fat and oil constituting chocolate by adding cocoa butter equivalent including a high ratio of SSU to the chocolate (for example, Patent Document 3). On the other hand, requirements from market are (1) chocolate containing only cocoa butter as the fat and oil (those including a large amount of cacao) and (2) chocolate containing cocoa butter equivalent including a high ratio of symmetric triacylglycerol (those containing specific fat and oil for improving the snap property at room temperature). However, in such chocolate, since the ratio of SUS in S2U contained in fat and oil constituting the chocolate is high, the ratio of SSU is relatively low, which causes a problem that blooming readily occurs during storage. In addition, when the POP content (one type of SUS) is particularly increased for imparting satisfactory melting texture to chocolate, the heat resistance is slightly inferior. Consequently, blooming readily occurs.

The edible fat and oil of the present invention can also improve blooming resistance of the chocolate having the above-mentioned problems.

The S2U content of fat and oil in chocolate raw materials that are added to the edible fat and oil of the present invention, POP/S2U, and SUS/S2U are not particularly limited, and any chocolate raw material can be used.

The edible fat and oil of the present invention exhibits the effect when it is added to chocolate material (chocolate before the addition of the fat and oil according to the present invention) whose fat and oil, for example, contains 70 to 100% of S2U and has POP/S2U in the range of 0.1 to 0.8, and, therefore, it is preferred. Fat and oil as chocolate raw material to which the edible fat and oil of the present invention is added preferably contains 75 to 95%, more preferably 80 to 95%, of S2U. In addition, POP/S2U can be adjusted to a preferred range and is preferably 0.2 to 0.5. Furthermore, it is preferred that the amount of S2U in the fat and oil be 83 to 92% and that POP/S2U be 0.25 to 0.43 (more preferably 0.25 to 0.35).

EXAMPLE

The present invention will be described further in detail hereinafter by reference to Examples. It is also understood that the scope of the present invention is not limited to such Examples. In the following Examples, "part(s)" and "%" represent "part(s) by mass" and "% by mass", respectively, unless otherwise noted.

Example 1

In the following Examples, used were fully hydrogenated palm kernel oil manufactured by Nisshin Oillio Group, Ltd., hydrogenated soybean oil (melting point: 55° C.) manufactured by Nisshin Oillio Group, Ltd., "fully hydrogenated palm oil" manufactured by Yokozeki Oil & Fat Corp. as fully hydrogenated palm oil, "fully hydrogenated high erucin rapeseed oil" manufactured by Yokozeki Oil & Fat Corp. as fully hydrogenated high erucin rapeseed oil, "Nisshin safflower oil" manufactured by Nisshin Oillio Group, Ltd. as high linoleic safflower oil, "fully hydrogenated rapeseed oil" manufactured by Yokozeki Oil & Fat Corp. as fully hydrogenated rapeseed oil, and "Olein Rich" manufactured by Showa Sangyo Co., Ltd. as high oleic sunflower oil. Their compositions are shown in Table 1. The symbol "-" in Table 1 means below detection limit. Details of the compositions of fully hydrogenated palm kernel oil and hydrogenated soybean oil will be described below.

Process of Producing Test Fats and Oils 1, 2, and 4

The fat-and-oil raw materials shown in Table 2 were mixed at blending ratios shown in Table 2, followed by stirring while heating at 65 to 70° C. to give 1.6 kg of uniform mixed oil. While stirring this mixed oil at 65 to 70° C., a lipase preparation in an amount of 0.3% by mass based on the total mass of the mixed oil was added thereto. The mixture was further stirred at 65 to 70° C. for 16 hours for transesterification reaction.

After the completion of the transesterification reaction, the lipase preparation was removed by filtration. The filtrate, i.e., fat and oil, was subjected to purification treatment for decolorization and deodorization according to a common procedure. The test fats and oils 1, 2, and 4 were thus obtained.

Process of Producing Test Fat and Oil 3

The test fat and oil 2 was dissolved in 4 mL of acetone per gram of transesterified oil, and the resulting mixture was cooled to 25° C. while stirring. Then, the precipitated fat and oil was removed by filtration to remove fat and oil having a high melting point. Then, acetone was removed from the filtrate. According to a common procedure, purification treatment for decolorization and deodorization was carried out to give test fat and oil 3 (yield: 50% by mass based on the transesterified oil).

Process of Producing Test Fat and Oil 5

The fat-and-oil raw materials shown in Table 2 were mixed at blending ratios shown in Table 2, followed by stirring while heating at 80° C. to give 1.6 kg of uniform mixed oil. While stirring this mixed oil at 80° C., sodium methylate, as a catalyst, was added thereto in an amount of 0.1% by mass based on the total mass of the mixed oil. The mixture was further stirred at 80° C. for 30 minutes for transesterification reaction.

After the completion of the transesterification reaction, the catalyst was removed by washing with water. The fat and oil was subjected to purification treatment for decolorization and deodorization according to a common procedure to give transesterified oil.

The resulting transesterified oil was dissolved in 4 mL of acetone per gram of the transesterified oil, and the resulting mixture was cooled to 35° C. while stirring. Then, the pre-

TABLE 1

| | Fully hydrogenated palm kernel oil | Hydrogenated soybean oil | Fully hydrogenated palm oil | Fully hydrogenated high erucin rapeseed oil | High linoleic sunflower oil | Fully hydrogenated rapeseed oil |
| --- | --- | --- | --- | --- | --- | --- |
| Iodine value | 0.4 | 42.2 | 0.8 | 0.9 | 142.6 | 0.8 |
| Lauric acid content (%) | 46.3 | — | 0.3 | 0.4 | — | — |
| Trans fatty acid (%) | — | 40.5 | — | — | 0.5 | — |
| Total amount of oleic acid, linoleic acid, and linolenic acid (%) | — | 6.8 | — | 0.1 | 89.2 | — | cipitated fat and oil was removed by filtration to remove a portion having a high melting point.

Then, the filtrate was cooled to 10° C. while stirring, and the precipitated fat and oil was collected by filtration to remove a portion having a low melting point.

Then, after removing the solvent from the collected fat and oil, purification treatment for decolorization and deodorization was carried out according to a common procedure to give test fat and oil 5 (yield: 45% by mass based on the transesterified oil).

The portion having a high melting point is fat and oil whose main ingredient is tri-saturated triacylglycerol.

Process of Producing Test Fat and Oil 6

The fat-and-oil raw materials shown in Table 2 were mixed at blending ratios shown in Table 2, followed by stirring while heating at 80° C. to give 1.6 kg of uniform mixed oil. While stirring this mixed oil at 80° C., sodium methylate, as a catalyst, was added thereto in an amount of 0.1% by mass based on the total mass of the mixed oil. The mixture was further stirred at 80° C. for 1 hour for transesterification reaction.

After the completion of the transesterification reaction, the catalyst was removed by washing with water. The fat and oil was subjected to purification treatment for decolorization and deodorization according to a common procedure to give transesterified oil.

The resulting transesterified oil was dissolved in 4 mL of acetone per gram of the transesterified oil, and the resulting mixture was cooled to 30° C. while stirring. Then, the precipitated fat and oil was removed by filtration to remove a portion having a high melting point.

Then, the filtrate was cooled to 10° C. while stirring, and the precipitated fat and oil was collected by filtration to remove a portion having a low melting point.

Then, after removing the solvent from the collected fat and oil, purification treatment for decolorization and deodorization was carried out according to a common procedure to give test fat and oil 6 (yield: 40% by mass based on the transesterified oil).

The portion having a high melting point is fat and oil whose main ingredient is tri-saturated triacylglycerol.

Test fat and oil 1 prepared as above corresponds to Example, and test fats and oils 2 to 6 correspond to Comparative Examples. The symbol "-" in Table 2 means that the corresponding fat-and-oil raw material was not used or the corresponding treatment was not carried out.

Test fats and oils 2 to 4, test fat and oil 5, and test fat and oil 6 correspond to the additives (fat and oil) described in Patent Document 1, Patent Document 2, and Patent Document 3, respectively.

TABLE 2

| | | Test fat and oil 1 Example | Test fat and oil 2 Comparative Example | Test fat and oil 3 Comparative Example | Test fat and oil 4 Comparative Example | Test fat and oil 5 Comparative Example | Test fat and oil 6 Comparative Example |
|---|---|---|---|---|---|---|---|
| Amount of fat-and-oil raw material in mixed oil (% by mass) | Hydrogenated soybean oil | 50 | — | — | — | — | — |
| | Fully hydrogenated palm kernel oil | 50 | 50 | 50 | 70 | — | — |
| | Fully hydrogenated palm oil | — | 50 | 50 | 30 | — | — |
| | Fully hydrogenated high erucin rapeseed oil | — | — | — | — | 50 | — |
| | High linoleic safflower oil | — | — | — | — | 50 | — |
| | Fully hydrogenated rapeseed oil | — | — | — | — | — | 50 |
| | High oleic sunflower oil | — | — | — | — | — | 50 |
| Transesterification reaction catalyst | | lipase | lipase | lipase | lipase | sodium methylate | sodium methylate |
| Acetone fractionation | | — | — | Removal of fraction of high melting point | — | Removal of fractions of high melting point and low melting point | Removal of fractions of high melting point and low melting point |

Measurement of Fatty Acid Composition, Trans Fatty Acid Content, and Iodine Value Test fats and oils 1 to 6 were each measured for fatty acid composition, trans fatty acid content, and iodine value by the following methods. Table 3 shows the fatty acid compositions and trans fatty acid contents, and Table 4 shows iodine values.

The symbol "-" in Table 3 means below detection limit. The "trans fatty acid" shown in Tables 3 and 10 is mainly C18:1 trans fatty acid. The "total amount of oleic acid, linoleic acid, and linolenic acid" shown in Tables 3 and 10 is a value calculated by subtracting the amount of trans fatty acids from the sum of the amounts of C18:1, C18:2, and C18:3. The amounts of C18:1, C18:2, and C18:3 shown in Tables 3 and 10 are each that of including both cis fatty acids and trans fatty acids.

Method of Measuring Fatty Acid Composition

The fatty acid composition was measured in accordance with Standard Methods for the Analysis of Fats, Oils and Relates Materials (2.4.1.1, 2-1996, 2.4.2.1, 2-1996) with a capillary gas chromatograph (HP 6890 gas chromatograph, manufactured by Japan Hewlett-Packard).

Method of Measuring Trans Fatty Acid Content

The amount of trans fatty acids was measured in accordance with AOCS method (Ce 1f-96) with a capillary gas chromatograph (HP 6890 gas chromatograph, manufactured by Japan Hewlett-Packard).

Method of Measuring Iodine Value

The iodine value was measured by Wijs method in accordance with Standard Methods for the Analysis of Fats, Oils and Relates Materials (2.3.4.1-1996).

TABLE 3

| Fatty acid content (%) in constituent fatty acids of fat and oil | Test fat and oil 1 Example | Test fat and oil 2 Comparative Example | Test fat and oil 3 Comparative Example | Test fat and oil 4 Comparative Example | Test fat and oil 5 Comparative Example | Test fat and oil 6 Comparative Example |
|---|---|---|---|---|---|---|
| C8:0 | 1.6 | 1.6 | 2.7 | 2.2 | — | — |
| C10:0 | 1.5 | 1.5 | 2.4 | 2.1 | — | — |
| C12:0 (lauric acid) | 22.6 | 21.7 | 31.5 | 30.4 | — | — |
| C14:0 | 8.1 | 8.2 | 9.0 | 11.0 | 0.1 | — |
| C16:0 | 10.0 | 26.1 | 23.1 | 19.3 | 4.9 | 4.5 |
| C17:0 | — | 0.1 | — | 0.1 | — | — |
| C18:0 | 29.9 | 40.0 | 28.1 | 34.3 | 20.4 | 55.6 |
| C18:1 | 25.4 | 0.2 | 1.9 | 0.2 | 7.7 | 34.8 |
| C18:2 | 0.3 | — | 0.8 | — | 32.6 | 2.3 |
| C18:3 | — | — | 0.2 | — | 0.1 | — |
| C20:0 | 0.4 | 0.5 | 0.3 | 0.4 | 4.6 | 1.4 |
| C22:0 | 0.2 | 0.1 | — | — | 28.6 | 1.0 |
| C24:0 | — | — | — | — | 1.0 | 0.4 |
| Total | 100 | 100 | 100 | 100 | 100 | 100 |
| Trans fatty acid | 21.8 | — | — | — | 0.9 | — |
| Total amount of oleic acid, linoleic acid, and linolenic acid | 3.9 | 0.2 | 2.9 | 0.2 | 39.5 | 37.1 |

TABLE 4

| Iodine value of fat and oil | Test fat and oil 1 Example | Test fat and oil 2 Comparative Example | Test fat and oil 3 Comparative Example | Test fat and oil 4 Comparative Example | Test fat and oil 5 Comparative Example | Test fat and oil 6 Comparative Example |
|---|---|---|---|---|---|---|
| Iodine value | 21.2 | 0.7 | 3.5 | 0.7 | 63.4 | 33.9 |

Evaluation of Fat Blooming Resistance of Chocolate Containing Test Fat and Oil

Method of Producing Chocolate Containing Test Fat and Oil

Five hundred grams of commercially available chocolate (Selectionee Noir: dark chocolate, manufactured by Daito Cacao Co., Ltd.) having a composition shown in Table 5 mentioned below was put in each of six stainless steel bowls. The chocolate was melted by placing the bowl in hot water of 60° C. Four grams of each of the test fats and oils 1 to 6 were added to chocolate in the respective bowls, followed by sufficient stirring at 60° C. After tempering (cooling chocolate to 26° C. while stirring and then heating it again to 30° C. while stirring), the chocolate was poured into each mold and cooled in a refrigerator at 8° C. for 20 minutes for hardening. Then, the mold was taken from the refrigerator, and the chocolate was removed from the mold. The chocolate was placed at 20° C. for one week to give chocolate containing the test fat and oil. The blending ratios of the resulting chocolate are shown in Table 6.

The blending ratios, shown in Table 5, of the commercially available chocolate are those estimated from the "raw material information" and "nutrition information" of the commercially available chocolate. The blending ratios, shown in Table 6, of the chocolate are calculated from the amount of the test fat and oil and the blending ratios of the commercially available chocolate shown in Table 5.

Chocolates containing test fats and oils 1 to 6 are test samples 1 to 6, respectively. Test sample 1 corresponds to Example, and test samples 2 to 6 correspond to Comparative Examples. The commercially available chocolate not containing the test fat and oil was used as a control (test sample 7).

TABLE 5

| Composition of commercially available chocolate | |
|---|---|
| Raw material information | cacao mass, sugar, cocoa butter, lecithin, flavoring (cacao content: 67%) |
| Nutrition information (per 100 g) | energy: 585 kcal, water: 1.1% or less, ash content: 2.3% or less, protein: 8.2 ± 1.0%, lipid: 39.0 ± 2.5%, carbohydrate: 47.99%, crude fiber: 2.38% |
| Blending ratio | cacao mass: 62%, sugar: 33%, cocoa butter (cacao butter): 5%, lecithin: adequate, flavoring: adequate |

TABLE 6

| Composition of chocolate containing test fat and oil | |
|---|---|
| Blending ratio | cacao mass: 61.5%, sugar: 32.7%, cocoa butter (cacao butter): 5%, lecithin: adequate, flavoring: adequate, test fat and oil: 0.8% |

Fat Amount of Commercially Available Chocolate

The fat amount of the commercially available chocolate is determined. About 55% of cacao mass, which is a raw material of the commercially available chocolate, is cocoa butter (fat) (i.e., this corresponds to about 34% of the total). In addition, cocoa butter is fat (i.e., this corresponds to 5% of the total). Therefore, the fat amount of the commercially available chocolate is about 39%.

S2U Content of the Total Fat and Oil of Chocolate, POP/S2U, and SUS/S2U

As shown above, the fat amount of the commercially available chocolate is about 39%, and all this fat content is cocoa butter. Since the S2U content of cocoa butter is about 85%, the S2U content of the total fat and oil of the chocolate is about 85%. In addition, since the POP content of cocoa butter is about 19%, the POP/S2U is about 0.22. Furthermore, since the SUS content of the S2U in cocoa butter is about 99%, the SUS/S2U of the fat and oil of the chocolate is about 0.99.

Ratio of Test Fat and Oil in the Total Fat Amount of Chocolate Containing the Test Fat and Oil As shown above, since the fat amount of the commercially available chocolate is about 39%, the fat amount in 500 g of the commercially available chocolate is about 195 g. Accordingly, the amount of fat in the chocolate containing 4 g of the test fat and oil is about 199 g. Therefore, the rate of the test fat and oil (4 g) to this 199 g of the fat amount (rate of the amount of the test fat and oil to the total amount of fat in the chocolate) is about 2%.

Blooming Test

The chocolate (test samples 1 to 6) prepared in the above and the commercially available chocolate (test sample 7) were subjected to a blooming test as below. Table 7 shows the results.

Method of Blooming Test

A cycle of placing chocolate at 20° C. for 12 hours and then at 32° C. for 12 hours was repeated eleven cycles as a periodic temperature change. At the completion of 2, 3, and 7 cycles, the chocolate was visually inspected whether blooming occurred. Table 7 shows the results, wherein "none" means no occurrence of blooming, and "bloom" means occurrence of blooming.

As shown in Table 7, the chocolates of test samples 2 to 7 (Comparative Examples and control) had blooming at the completion of 7 cycles (after 168 hours) and are therefore unsatisfactory as commercial products. The chocolate of test sample 1 (Example) did not have blooming even at the completion of 7 cycles (after 168 hours). Therefore, it was confirmed that the chocolate of test sample 1 is excellent as a commercial product.

As described above, it was confirmed that the chocolate according to the present invention has significantly high blooming resistance and the fat and oil according to the present invention exhibits significantly high anti-blooming activity.

Example 2

Measurement of Solid Fat Content

The chocolate according to the present invention has the above-mentioned blooming resistance. In addition, a chocolate composition having certain hardness and melting properties is more preferred. Accordingly, in order to evaluate hardness and melting properties, test fat and oil 1 and test fats and oils 8 to 10 prepared so as to have fat-and-oil raw materials at the ratios shown in Table 8 were measured for SFC (solid fat content) by the method mentioned below under various temperature conditions. Table 9 shows the results. Cacao butter was used as a control.

Method of Measuring SFC

The SFCs of test fats and oils 1 and 8 to 10 were measured according to Standards Methods for the Analysis of Fat and oil (provisional method) with a pulse NMR solid fat content analyzer (manufactured by Resonance Instruments Ltd.).

The SFC of cacao butter was measured by IUPAC method (IUPAC 2.150(b)-S).

Method of Producing Test Fats and Oils 8, 9, and 10

Test samples 8 to 10 were prepared by the same method for producing the above-mentioned test fats and oils 1, 2, and 4 except that the fat-and-oil raw materials shown in Table 8 were used at the blending ratios shown in Table 8. These test samples correspond to Examples.

TABLE 7

| | | Fat and oil | 2 cycles (stored for 48 hrs) | 3 cycles (stored for 72 hrs) | 7 cycles (stored for 168 hrs) |
|---|---|---|---|---|---|
| Test sample 1 | Example | test fat and oil 1 | none | none | none |
| Test sample 2 | Comparative Example | test fat and oil 2 | none | bloom | bloom |
| Test sample 3 | Comparative Example | test fat and oil 3 | none | none | bloom |
| Test sample 4 | Comparative Example | test fat and oil 4 | none | none | bloom |
| Test sample 5 | Comparative Example | test fat and oil 5 | none | none | bloom |
| Test sample 6 | Comparative Example | test fat and oil 6 | none | bloom | bloom |
| Test sample 7 | Control | None | none | bloom | bloom |

TABLE 8

|  |  | Tests fat and oil 8 Example | Test fat and oil 1 Example | Test fat and oil 9 Example | Test fat and oil 10 Example |
|---|---|---|---|---|---|
| Amount of each ingredient in transesterified fat and oil (% by mass) | Hydrogenated soybean oil | 40 | 50 | 60 | 70 |
|  | Fully hydrogenated palm kernel oil | 60 | 50 | 40 | 30 |

TABLE 9

| SFC (° C.) | Cacao butter Control | Test fat and oil 8 Example | Test fat and oil 1 Example | Test fat and oil 9 Example | Test fat and oil 10 Example |
|---|---|---|---|---|---|
| 10 | 83.2 | 85.0 | 87.4 | 86.7 | 87.9 |
| 15 | 77.5 | 79.6 | 82.3 | 81.1 | 82.4 |
| 20 | 71.8 | 72.9 | 76.0 | 74.6 | 76.5 |
| 25 | 62.4 | 62.1 | 66.6 | 66.9 | 70.6 |
| 30 | 39.3 | 40.4 | 45.5 | 51.8 | 58.8 |
| 35 | 0 | 16.3 | 24.2 | 30.9 | 39.7 |
| 40 | 0 | 3.4 | 7.0 | 12.7 | 19.7 |
| 45 | 0 | 0 | 0.4 | 2.5 | 6.8 |
| 50 | 0 | 0 | 0 | 0 | 0.7 |

As shown in Table 9, the solid contents of test fat and oil 10 at 35° C. and 40° C. were larger than those of cacao butter. It is preferable that fat and oil added to chocolate be slightly harder than cacao butter. Test fat and oil 8 has hardness similar to that of cacao butter at 10 to 30° C. and is soft. Thus, it was confirmed that, in the viewpoints of hardness and melting properties of chocolate, test fats and oils 1 and 9 are more preferred.

Fatty Acid Composition at Each Blending Ratio of Hydrogenated Soybean Oil and Fully Hydrogenated Palm Kernel Oil Fatty acid compositions and iodine values (measured values) of hydrogenated soybean oil and fully hydrogenated palm kernel oil were measured, and fatty acid compositions and iodine values (calculated values) of transesterified fat and oil at each blending ratio were determined. These values were compared to measured values of test fats and oils 1 and 8. Tables 10 and 11 show the results. The symbol "-" in Table 10 means below detection limit.

TABLE 10

|  | Measured value | Calculated value | Calculated value | Test fat and oil 1 Measured value | Calculated value | Calculated value | Test fat and oil 9 Measured value | Calculated value | Calculated value | Calculated value | Calculated value | Calculated value | Measured value |
|---|---|---|---|---|---|---|---|---|---|---|---|---|---|
| Blending ratio of hydrogenated soybean oil | 0 | 40 | 45 | 50 | 50 | 55 | 60 | 60 | 65 | 70 | 75 | 80 | 100 |
| Blending ratio of highly hydrogenated palm kernel oil | 100 | 60 | 55 | 50 | 50 | 45 | 40 | 40 | 35 | 30 | 25 | 20 | 0 |
| C6:0 | 0.2 | — | — | — | — | — | — | — | — | — | — | — | — |
| C8:0 | 3.5 | 2.1 | 1.9 | 1.6 | 1.8 | 1.6 | 1.3 | 1.4 | 1.2 | 1.1 | 0.9 | 0.7 | — |
| C10:0 | 3.3 | 2.0 | 1.8 | 1.5 | 1.7 | 1.5 | 1.2 | 1.3 | 1.2 | 1.0 | 0.8 | 0.7 | — |
| C12:0 | 46.3 | 27.8 | 25.5 | 22.6 | 23.1 | 20.8 | 18.1 | 18.5 | 16.2 | 13.9 | 11.6 | 9.3 | — |
| C14:0 | 16.1 | 9.7 | 8.9 | 8.1 | 8.1 | 7.3 | 6.5 | 6.4 | 5.6 | 4.8 | 4.0 | 3.2 | — |
| C16:0 | 8.9 | 9.7 | 9.8 | 10.0 | 9.9 | 10.0 | 10.2 | 10.0 | 10.1 | 10.2 | 10.3 | 10.4 | 10.8 |
| C17:0 | 0.0 | 0.1 | 0.1 | 0.1 | 0.1 | 0.1 | 0 | 0.1 | 0.1 | 0.1 | 0.2 | 0.2 | 0.2 |
| C18:0 | 21.6 | 29.1 | 30.1 | 29.9 | 31.1 | 32.0 | 32.9 | 33.1 | 34.0 | 34.9 | 35.8 | 36.8 | 40.6 |
| C18:1 | 0 | 18.7 | 21.1 | 25.4 | 23.4 | 25.8 | 28.7 | 28.3 | 30.5 | 32.8 | 35.1 | 37.4 | 46.8 |
| C18:2 | 0.0 | 0.2 | 0.2 | 0.3 | 0.3 | 0.3 | 0.3 | 0.3 | 0.3 | 0.4 | 0.4 | 0.4 | 0.5 |
| C18:3 | — | — | — | — | — | — | — | — | — | — | — | — | — |
| C20:0 | 0.1 | 0.3 | 0.3 | 0.4 | 0.3 | 0.3 | 0.4 | 0.3 | 0.4 | 0.4 | 0.4 | 0.4 | 0.5 |
| C22:0 | — | 0.2 | 0.2 | 0.2 | 0.2 | 0.2 | 0.3 | 0.2 | 0.3 | 0.3 | 0.3 | 0.3 | 0.4 |
| C24:0 | — | 0.1 | 0.1 | 0.0 | 0.1 | 0.1 | 0.1 | 0.1 | 0.1 | 0.1 | 0.2 | 0.2 | 0.2 |
| Total | 100 | 100 | 100 | 100 | 100 | 100 | 100 | 100 | 100 | 100 | 100 | 100 | 100 |
| Trans fatty acid | 0.0 | 16.2 | 18.2 | 21.8 | 20.3 | 22.3 | 24.8 | 24.5 | 26.4 | 28.4 | 30.4 | 32.4 | 40.5 |
| Total amount of oleic acid, linoleic acid, and linolenic acid | 0.0 | 2.7 | 3.1 | 3.9 | 3.4 | 3.8 | 4.2 | 4.1 | 4.4 | 4.8 | 5.1 | 5.4 | 6.8 |

As shown in Table 10, errors between the measured values and calculated values were 2% or less.

TABLE 11

| | Measured value | Calculated value | Calculated value | Test fat and oil 1 Measured value | Calculated value | Calculated value | Test fat and oil 9 Measured value | Calculated value | Calculated value | Calculated value | Calculated value | Calculated value | Measured value |
|---|---|---|---|---|---|---|---|---|---|---|---|---|---|
| Blending ratio of hydrogenated soybean oil | 0 | 40 | 45 | 50 | 50 | 55 | 60 | 60 | 65 | 70 | 75 | 80 | 100 |
| Blending ratio of fully hydrogenated palm kernel oil | 100 | 60 | 55 | 50 | 50 | 45 | 40 | 40 | 35 | 30 | 25 | 20 | 0 |
| Iodine value | 0.4 | 16.5 | 18.5 | 21.2 | 20.6 | 22.7 | 25.6 | 24.7 | 26.8 | 28.8 | 31.6 | 33.7 | 42.2 |

As shown in Table 11, errors between the measured values and the calculated values were 1 or less.

Example 3

Evaluation of Fat Blooming Resistance of Chocolate Containing Fat and Oil Having a High Symmetric Triacylglycerol Content Method of Producing Fat and Oil Having a High Symmetric Triacylglycerol Content Fat and oil having a high POP content (POP concentrated fat and oil) was used as the fat and oil having a high symmetric triacylglycerol content. The POP concentrated fat and oil can be produced according to a common procedure (for example, see Japanese Unexamined Patent Application Publication No. 11-169191).

Specifically, the POP concentrated fat and oil can be produced as follows: A column having a diameter of 2.2 cm and a length of 16 cm was filled with 20 g of 1,3-specific lipase (trade name: Lipozyme IM, manufactured by Novo Nordisk). The temperature of the column was controlled to 40° C., and a melting fraction of palm oil warmed to 40° C. was applied to the column at a flow rate of 1.8 g/min. After 20 hours, 2100 g of reaction oil was obtained. The reaction oil (1600 g) was placed in a crystallization container, and 8000 g of acetone was added thereto for dissolving the oil, followed by cooling to 20° C. The precipitated solid content was removed by filtration. The solution portion was further cooled to 5° C., and the resulting solid content was collected by filtration. Acetone was removed from the solid content, followed by purification according to a common method to give 1000 g of POP concentrated fat and oil.

Triacylglycerol Analysis

Gas chromatograph analysis was carried out according to JAOCS, vol. 70, 11, 1111-1114 (1993) with a gas chromatograph HP 6890 (manufactured by Agilent Technologies, Inc.).

Symmetric Triacylglycerol Analysis

SUS/SSU ratio was measured with an LC-MS/MS (Quattro micro, manufactured by Japan Waters Corp.).

POP Concentrated Fat and Oil

The POP concentrated fat and oil obtained by the above-described method was analyzed. The melting point of the POP concentrated fat and oil was 32° C., and the iodine value was 31. The POP concentrated fat and oil had a POP content of 72% by weight, an S2U content of 92% by weight, an SUS content of 89% by weight, and an SSU content of 3% by weight, and POP/S2U and SUS/S2U were 0.78 and 0.97, respectively.

Method of Producing Chocolate

Chocolate materials (test materials 1 and 2) having the blending ratios shown in Table 12 were prepared in a melted form by mixing, rolling, and conching according to a common procedure for producing chocolate. Test fat and oil 1 was added to each of the material in an amount of 1% of the total amount of fat and oil in the chocolate (0.34 parts by mass of test fat and oil 1 was added to 100 parts by mass of test material 1 or 2). Then, after tempering, the chocolate materials were each poured into a mold and cooled for hardening. The hardened chocolate was removed from the mold and left at 20° C. for one week to give a test chocolate bars (Examples 1 and 2). As comparative samples, test chocolate bars (Comparative Examples 1 and 2) were prepared by the same procedure using material not containing test fat and oil 1.

TABLE 12

| | Test material 1 | Test material 2 |
|---|---|---|
| Sugar | 47.45 | 47.45 |
| Cacao mass | 40.00 | 40.00 |
| Cocoa butter | 7.00 | 0 |
| POP concentrated fat and oil | 5.00 | 12.00 |
| Lecithin | 0.50 | 0.50 |
| Flavoring | 0.05 | 0.05 |
| Total | 100.00 | 100.00 |

Fat Contents of Test Materials 1 and 2

About 55% of cacao mass is cocoa butter (fat) (which corresponds to about 22% of the total). In addition, cocoa butter and the POP concentrated fat and oil are fat (which corresponds to 12% of the total). Therefore, the fat amount in each of test materials 1 and 2 is about 34%.

S2U Content of Total Fat and Oil in Chocolate, POP/S2U, and SUS/S2U

Material 1: As described above, in this chocolate material, the amount of fat is about 34%, the amount of the POP concentrated fat and oil is 5%, and the amount of cocoa butter is 29%. Since the S2U content of the POP concentrated fat and oil is 92% and the S2U content of the cocoa butter is about 85%, the S2U content of the total fat and oil in the chocolate is 86%. Furthermore, since the POP content of the POP concentrated fat and oil is 72% and the POP content of the cocoa butter is about 19%, the POP content of the total fat and oil in the chocolate is 27%, and POP/S2U is 0.31. Furthermore, the SUS content and the SSU content of the S2U in cocoa butter are 99% and 1%, respectively, and the SUS content and the SSU content of the S2U in the POP concentrated fat and oil is 97% and 3%, respectively. Therefore, the SUS/S2U of the fat and oil in the chocolate is about 0.99.

Material 2: As described above, in this chocolate material, the amount of fat is about 34%, the amount of the POP concentrated fat and oil is 12%, and the amount of cocoa butter is 22%. The S2U content of the total fat and oil in the chocolate is 88%, the POP content of the total fat and oil in the chocolate is 38%, the POP/S2U of the total fat and oil in the chocolate is 0.43, and the SUS/S2U of the fat and oil in the chocolate is about 0.98.

Blooming Test

The blooming test was carried out using the test chocolate bars (Examples 1 and 2, Comparative Examples 1 and 2) by the following method. The results are shown in Table 13.

Method of Blooming Test

A cycle of placing test chocolate bars at 20° C. for 12 hours and then at 32° C. for 12 hours was repeated five cycles as a periodic temperature change. At the completion of each cycle, the test chocolate bars were visually inspected whether blooming occurred. The results are shown in Table 13.

The chocolate bars not having blooming are indicated by "none", and those having blooming are evaluated using five criteria according to the degree of whitening and indicated by "x1 to x5" (x1: occurrence of a small amount of white substance (blooming) to x5: whitening of the entire surface).

TABLE 13

|  | POP concentrated fat and oil (%) | S2U content of the total fat and oil in chocolate (%) | POP/S2U of total fat and oil in chocolate | Addition of test fat and oil 1 | 1 cycle | 2 cycles | 3 cycles | 4 cycles | 5 cycles |
|---|---|---|---|---|---|---|---|---|---|
| Example 1 | 5 | 86 | 0.31 | yes | none | none | none | none | x4 |
| Comparative Example 1 | 5 | 86 | 0.31 | no | none | none | x1 | x3 | x5 |
| Example 2 | 12 | 88 | 0.43 | yes | none | x4 | x5 | x5 | x5 |
| Comparative Example 2 | 12 | 88 | 0.43 | no | none | x5 | x5 | x5 | x5 |

As shown in Table 13, it was confirmed that in the material containing 5% by weight of the POP concentrated fat and oil, the occurrence of blooming in Example 1 (blooming occurred at 5 cycles) was delayed compared to that in Comparative Example 1 (blooming occurred at 3 cycles).

Furthermore, it was confirmed that in the material containing 12% of the POP concentrated fat and oil, blooming occurred at 2 cycles in both Example 2 and Comparative Example 2, but the degree of the blooming at the 2 cycles in Example 2 was lower than that in Comparative Example 2. That is, it was confirmed that the edible fat and oil of the present invention can improve the anti-blooming properties of chocolate having a high POP content.

Thus, it is obvious that the edible fat and oil according to the present invention can improve anti-blooming properties of chocolate containing cocoa butter and also of chocolate containing fat and oil that contains symmetric triacylglycerol at a high concentration for improving the snap property.

The invention claimed is:

1. Edible fat and oil obtained by transesterification reaction or esterification reaction and satisfying the following requirements (A) to (D):
    (A) iodine value: 15 to 29;
    (B) amount of trans fatty acids in the constituent fatty acids: 16 to 29% by mass;
    (C) amount of lauric acid in the constituent fatty acids: 13 to 28% by mass; and
    (D) total amount of oleic acid, linoleic acid, and linolenic acid in the constituent fatty acids: less than 10% by mass.

2. The edible fat and oil according to claim 1 obtained by transesterifying mixed oil, wherein
    the mixed oil contains hydrogenated oil whose iodine value is 45 or less and the amount of trans fatty acids in the constituent fatty acids is 30% by mass or more; and
    fat and oil whose iodine value is 10 or less and the amount of lauric acid in the constituent fatty acids is 40% by mass or more.

3. The edible fat and oil according to claim 2, wherein the hydrogenated oil is hydrogenated soybean oil; and the fat and oil is fully hydrogenated palm kernel oil.

4. The edible fat and oil according to claim 3, wherein the mixing ratio of the hydrogenated oil and the fat and oil in the mixed oil is 4:6 to 7:3.

5. The edible fat and oil according to claim 4, being applied to chocolate.

6. Chocolate containing the edible fat and oil according to claim 5.

7. Chocolate containing the edible fat and oil according to claim 5 in an amount of 0.5 to 10% by mass based on the total amount of the fat and oil in the chocolate.

8. The edible fat and oil according to claim 3, being applied to chocolate.

9. Chocolate containing the edible fat and oil according to claim 8.

10. Chocolate containing the edible fat and oil according to claim 8 in an amount of 0.5 to 10% by mass based on the total amount of the fat and oil in the chocolate.

11. The edible fat and oil according to claim 2, wherein the mixing ratio of the hydrogenated oil and the fat and oil in the mixed oil is 4:6 to 7:3.

12. The edible fat and oil according to claim 11, being applied to chocolate.

13. Chocolate containing the edible fat and oil according to claim 12.

14. Chocolate containing the edible fat and oil according to claim 12 in an amount of 0.5 to 10% by mass based on the total amount of the fat and oil in the chocolate.

15. The edible fat and oil according to claim 2, being applied to chocolate.

16. Chocolate containing the edible fat and oil according to claim 15.

17. Chocolate containing the edible fat and oil according to claim 15 in an amount of 0.5 to 10% by mass based on the total amount of the fat and oil in the chocolate.

18. The edible fat and oil according to claim 1, being applied to chocolate.

19. Chocolate containing the edible fat and oil according to claim 18.

20. Chocolate containing the edible fat and oil according to claim 18 in an amount of 0.5 to 10% by mass based on the total amount of the fat and oil in the chocolate.

21. A process of producing edible fat and oil comprising: transesterifying mixed oil, wherein
    the mixed oil contains hydrogenated oil whose iodine value is 45 or less and the amount of trans fatty acids in the constituent fatty acids is 30% by mass or more, and fat and oil whose iodine value is 10 or less and the amount of lauric acid in the constituent fatty acids is 40% by mass or more; and the mixing ratio of the hydrogenated oil and the fat and oil in the mixed oil is adjusted such that the resulting edible fat and oil satisfy the following requirements (A) to (D):

(A) iodine value: 15 to 29;
(B) amount of trans fatty acids in the constituent fatty acids: 16 to 29% by mass;
(C) amount of lauric acid in the constituent fatty acids: 13 to 28% by mass; and
(D) total amount of oleic acid, linoleic acid, and linolenic acid in the constituent fatty acids: less than 10% by mass.

* * * * *